United States Patent Office 3,629,470
Patented Dec. 21, 1971

3,629,470
PROCESS FOR PURIFICATION OF ANIMAL RNA VIRUSES
Alexander David Kanarek and George William Tribe, London, England, assignors to Burroughs Wellcome & Co. (U.S.A.) Inc., Tuckahoe, N.Y.
No Drawing. Filed Apr. 8, 1968, Ser. No. 719,675
Int. Cl. A61k 27/00
U.S. Cl. 424—89                                    13 Claims

ABSTRACT OF THE DISCLOSURE

A process for the purification or concentration of animal RNA viruses of the myxovirus or paramyxovirus group or the respiratory syncytial or rubella viruses which includes the steps of precipitating the virus from solution by means of a water soluble polyalkylene glycol in the presence of an electrolyte having a particular concentration in a substantially neutral medium and separating the precipitate containing the virus.

---

This invention relates to the purification and concentration of animal viruses, and in particular to concentrated vaccines containing such viruses.

It has been known that animal viruses can, for instance, be grown in tissue cultures or in embryonated hen's eggs. Tissue culture fluids or allantoic fluids, as harvested, contain considerable amounts of nonviral protein and other impurities, and much research effort has been spent to provide means for separating the viruses from these other materials. In addition, the virus suspension must often be concentrated to provide sufficient viral antigen in a convenient dose.

Methods using, for instance, ultracentrifugation, adsorption to barium sulphate or precipitation with ammonium sulphate or organic solvents have been suggested or used to obtain the virus in a concentrated and preferably purified form suitable for use in a vaccine. Ultracentrifugation, however, requires very expensive specialised equipment and preferably the use of density gradients for satisfactory separation, and cannot be scaled up without considerable further expense. Neither adsorption-elution nor precipitation with salts or solvents is sufficiently selective, and the use of such chemical agents has been detrimental to sensitive viruses, such as the respiratory syncytial virus or the rubella virus.

It has now been found that certain animal RNA viruses having helical cores, such as *Myxovirus influenzae-A*, *influenzae-B*, (Myxovirus group) *parainfluenzae-3*, Simian virus 5, (Paramyxovirus group) and particularly the respiratory syncytial virus and the rubella virus, can be precipitated from aqueous suspensions by means of treating the suspension with polyethylene glycol in the presence of an electrolyte, such as sodium chloride. The precipitation may advantageously be carried out at a neutral pH range, preferably around pH 7.4, without the necessity of increasing the salt concentration above the strength of normal physiological saline solutions. This enables the concentration of viruses, which are sensitive to more extreme conditions in this respect, and not only sustains the viability of the virus but also minimises the loss of immunogenicity during the process. The precipitated virus may then be collected in a fraction representing one tenth to one fiftieth of the original volume, leaving a considerable amount of undesirable impurities in the supernatant other fraction which is practically virus-free.

According to the invention in one aspect therefore there is provided a process for the purification or the concentration of any of the above defined animal RNA viruses, which comprises the steps of precipitating the virus from an aqueous solution by means of a water soluble polyalkylene glycol in the presence of an electrolyte having a concentration of about 0.15 N in a substantially neutral medium, and separating the fraction containing the virus. In a particular aspect, the process as hereinbefore defined is used to provide a concentrated or purified fraction of the respiratory syncytial virus or the rubella virus.

It is convenient to use polyethylene glycol for the purpose of the present invention, although other soluble polyalkylene glycols, having for instance alkylene groups containing a few carbon atoms, may also have a similar effect. Polyethylene glycols are condensation products of ethylene oxide and water represented by the formula $H(OCH_2CH_2)_nOH$. The solubility of the condensate depends on $n$ and "polyethylene glycol 6000" representing a range from $n=80$ to 180, preferably around $n=120$, is satisfactory for the purpose. It has been observed that the viral activity removed from the suspension is proportional to the amount of precipitating agent up to the optimum level of 7.5% w./v. polyethylene glycol. To provide the best conditions for the precipitation of the respiratory syncytial virus and the rubella virus, the pH was adjusted to pH 7.4.

As an electrolyte an inorganic salt innocuous to the virus may be used. Sodium chloride has been found satisfactory for the purpose, and the concentration of this electrolyte may advantageously be adjusted so as to represent a normal physiological saline concentration of 0.9%, or about 0.15% N. Above this concentration the efficiency of the separation is reduced.

Precipitation of some of the residual cell debris may also occur when the process is directly applied to a suspension incorporating the tissue culture fluid. The considerable reduction of volume which is obtained by the process according to the present invention, greatly simplifies and improves the application of possible other procedures and treatments, such as gel filtration, chromatography or inactivation of the virus by means of treating the virus with a solvent non-miscible with water. In certain cases of influenza viruses, there has been an apparent increase of the haemagglutination titres in consequence of the precipitation, which may probably be attributed to an advantageous and unexpected disaggregation of some agglutinated virus particles.

The sedimentation of the precipitated virus may be accelerated by centrifugation. For this purpose comparatively low-speed centrifuges, providing an equivalent of 3,000 g., have been found satisfactory. According to the invention in a further particular aspect the process as hereinbefore defined is further improved by allowing the suspension of the virus to stand at 4° C. for about an hour after the treatment with the precipitating agent, and by subsequently subjecting it to a centrifugation from 2,000 to 10,000 g., preferably at 3,500 to 6,000 g., for about 20 minutes, or by continuous flow at a rate of 50 to 100 ml./min. through a centrifuge developing 12,000 g.

On a larger scale the precipitation may be carried out in two or more separate stages providing a corresponding number of fractions representing various degrees of purity. The less preferred fractions may then be subjected to further purification or might be re-cycled into the process.

After sedimentation the supernatant fluid is removed, and the deposit representing the fraction rich in the virus is re-suspended with a phosphate or citric saline buffer of pH 7 to 8 or with a 1% trypsin in phosphate buffered saline solution. (Dulbecco et al., J. exp. Med., 1954, 99, 167.) Such a buffer may also contain the constituents of of medium S.M. 199 (Morton et al., Proc. Soc. Exp. Biol. Med. 1950, 73, 1). When trypsin is used, the concentrate may be incubated at 37° C. for 30 minutes, and then clarified by further centrifugation.

The volume of the aqueous solution used for resuspending the virus deposit is suitably adjusted so that the purified virus suspension may still represent at least a 10-fold concentration when compared with the original volume. The virus may then be inactivated by means of chemical or physical agents and is used as a vaccine after appropriate testing. Influenza, bovine parainfluenzae-3 and the Simian virus 5 have been assayed by the haemagglutination test, since this characteristic is used for the standardisation of vaccine preparations. The concentrated vaccine is also tested for infectivity or antigenicity, and this strength is adjusted complying with statutory regulations.

The following examples illustrate the invention.

EXAMPLE 1

Respiratory syncytial virus (T.F. Strain) was cultivated in primary cultures of *Erythrocebus patas* monkey kidney cells. The cultures were frozen when the cytopathic effect of the virus was maximal and then thawed. The harvested fluid with disrupted cells was clarified by centrifugation at 2000 g. for 10 minutes.

To 1350 ml. of clarified tissue culture fluid (TCF) was added 450 ml. 30% w./v. polyethylene glycol 6000 solution in buffered physiological saline. The pH of the final mixture was 7.1 and it was adjusted to pH 7.4 by the addition of 0.1 M sodium hydroxide.

The mixture contained 7.5% w./v. polyethylene glycol and was mixed thoroughly and allowed to stand at 4° C. for 3 hours. The flocculant precipitate was then collected by centrifugation at 4,000 g. for 30 minutes. The supernatant was removed and the precipitate resuspended in phosephate-buffered physiological saline. The final volume of the resuspended material was 20 ml., representing a volume 1/67.5 of the original.

The original TCF and the concentrate were assayed for infectivity with the following result:

Original: $10^{2.3} TCID_{50}/ml.$
Concentrate: $10^{4.15} TCID_{50}/ml.$

Concentration factor: 1.75 log units or 56 times. Within the limits of experimental error, this represents quantitative recovery of the viral infectivity.

EXAMPLE 2

Rubella virus (HPV-77 Strain) was cultivated in suspended cultures of BHK-21 (Baby Hamster kidney diploid cell strain clone 21, cf. Stoker et al., Virology, 14, 359–370 or British patent specification 1,015,262) and the cultures frozen at the optimum time for virus yield. The fluids were thawed and clarified as in Example 1.

To 450 ml. of clarified TCF was added 150 ml. polyethylene glycol 6000 solution and the pH of the mixture was adjusted to 7.4. After mixing and standing at 4° C. overnight, the precipitate that formed was collected by centrifugation at 4000 g. for 20 minutes and resuspended in medium S.M. 199. The volume of the final concentarte was 9 ml., representing a fifty-fold volume reduction.

The original fluid and the concentrate were assayed for infectivity in *E. patas* monkey kidney cell cultures by the interference method. Bovine virus type M6 was used as the super-infecting agent.

Results:
Original TCF $10^{5.8} TCID_{50}/ml.$
Concentrate $10^{7.3} TCID_{50}/ml.$ Concentration factor 1.5 log units, or 32 times.

EXAMPLE 3

Influenza virus type $A_2/Eng/66$ was cultivated in the allantois of 11 day old embryonated eggs and the allantoic fluid harvested 2–3 days later.

The virus was precipitated from these fluids by addition of polyethylene glycol solution as in Example 1, but no adjustment of pH was necessary.

Results:
Volume allantoic fluid_____ 100 ml.
Volume PEG_____ 33 ml.
Volume of concentrate_____ 2 ml. (1/50).

|  | H.A. | Infectivity |
|---|---|---|
| Assay: | | |
| Original_____ | 32_____ | $10^{5.55} EID_{50}/ml.$ |
| Concentrate_____ | 2,048_____ | $10^{7.05} EID_{50}/ml.$ |
| Concentration factors_____ | 64 times___ | 56 times. |

EXAMPLE 4

Influenza virus type $A_2/Eng/66$ was cultivated in rolled cultures of secondary calf kidney cells and the fluids treated as in Example 1.

Results:
Volume TCF_____ 200 ml.
Volume PEG_____ 66 ml.
Volume of concentrate_____ 2.3 ml. (1/87)

|  | H.A. | Infectivity |
|---|---|---|
| Assay: | | |
| Original_____ | 8_____ | $10^{5.05} EID_{50}/ml.$ |
| Concentrate_____ | 512_____ | $10^{7.05} EID_{50}/ml.$ |
| Concentration factors_____ | 64 times___ | 100 times. |

EXAMPLE 5

Influenza type B/Eng/66 was cultivated and concentrated as in Example 3 to yield a volume 1/40 of the original.

|  | H.A. | Infectivity |
|---|---|---|
| Results: | | |
| Original allantoic fluid___ | 80_____ | $10^{7.3}/ml.$ |
| Concentrate_____ | 2,560_____ | $10^{9.05}/ml.$ |
| Concentration factors_____ | 32 times___ | 56 times. |

EXAMPLE 6

Influenza type B/Eng/66 was cultivated and concentrated as in Example 4, to yield a volume 1/50 of the original.

|  | H.A. | Infectivity |
|---|---|---|
| Results: | | |
| Original_____ | 128_____ | $10^{6.3}/ml.$ |
| Concentrate_____ | 5,120_____ | $10^{8.05}/ml.$ |
| Concentration factors_____ | 40 times___ | 56 times. |

EXAMPLE 7

Simian virus type 5 was cultivated in primary calf kidney tissue cultures and concentrated as in Example 1, to yield a volume 1/64 of the original.

|  | H.A. | Infectivity |
|---|---|---|
| Results | | |
| Original_____ | 32_____ | $10^{5.05} TCID_{50}/ml.$ |
| Concentrate_____ | 2,048_____ | $10^{7.8} TCID_{50}/ml.$ |
| Concentration factors__ | 64 times___ | 56 times. |

EXAMPLE 8

Bovine parainfluenza virus type 3 was cultivated and concentrated as in Example 7, to yield a volume 1/64 of the original.

|  | H.A. | Infectivity |
|---|---|---|
| Results: | | |
| Original TCF_____ | 128_____ | $10^{7.3} TCID_{50}/ml.$ |
| Concentrate_____ | 8,192_____ | $10^{9.05} TCID_{50}/ml.$ |
| Concentration factors__ | 64 times___ | 56 times. |

EXAMPLE 9

Influenza virus type $A_2$/England/66 was cultivated in primary cultures of calf kidney cells. The cultures were frozen when the cytopathic effect of the virus was maximal and then thawed. The harvested fluid with disrupted cells was clarified by centrifugation at 2,000 g. for 10 minutes.

To 7.6 litres of clarified TCF was added 2.5 l. 30% w./v. polyethylene glycol 6,000 in buffered physiological saline.

The mixture contained 7.5% w./v. polyethylene glycol and was mixed thoroughly and allowed to stand at 4° C. for 3 hours.

The precipitate was collected by centrifugation at 3,000 g. for 30 minutes. The supernatant was removed and the precipitate resuspended in 380 ml. of citrate-buffered physiological saline solution containing 6% w./v. sucrose, giving a volume reduction of 1/20.

Results.—Haemagglutination titre:
Original TCF: 128
Concentrate: 4096 (×32)

The concentrated influenza virus suspension was inactivated with tetrachloro ethylene according to the process described and claimed in British specification No. 1,096,951, and yielded a non-toxic vaccine which was as potent in human subjects as similar vaccines prepared by other methods of concentration, e.g. centrifugation.

EXAMPLE 10

Influenza virus type B/England/66 was propagated and clarified as in Example 9. To 3.0 litres of clarified infected TCF was added 900 ml. 30% w./v. polyethylene glycol 6,000 solution. The final concentration of polyethylene glycol was 7%. After precipitation and centrifugation the precipitate was resuspended in 150 ml. citrate-sucrose-saline solution.

Results.—H.A. titres:
TCF: 1024
Concentrate: 32,768 (×32)

The concentrated virus suspension, after inactivation, yielded a non-toxic vaccine of antigenic potency in man comparable with that obtained with vaccines concentrated, e.g. by centrifugation.

What we claim is:
1. A process for the purification of an animal RNA virus having a helical core selected from myxoviruses, paramyxoviruses, respiratory syncytial virus, and rubella virus, which comprises contacting an aqueous, buffered, physiological saline solution of said virus with a water soluble polyethylene glycol of the formula

$$H(OCH_2CH_2)_nOH$$

where $n$ ranges from 80 to 180, said polyethylene glycol being present in an amount effective to precipitate said virus, and separating the precipitated product.

2. A process according to claim 1 wherein the pH of the physiological saline solution of the virus is substantially neutral.

3. A process according to claim 1 wherein the polyethylene glycol is polyethylene glycol 6000.

4. A process according to claim 1 wherein the polyethylene glycol is present to a concentration of 7.5% w./v.

5. A process according to claim 1 wherein the saline solution contains sodium chloride at a concentration of about 0.15 N.

6. A process according to claim 1 wherein the solution of the virus is allowed to stand at 4° C. for about an hour in contact with the polyethylene glycol and is subsequently subjected to centrifugation at 2,000 to 10,000 g. at a continuous flow rate of 50 to 100 ml. per minute.

7. A process according to claim 1 wherein the virus is a strain of *Myxovirus influenzae-A* or *influenzae-B*.

8. A process according to claim 1 wherein the virus is a strain of *Myxovirus parainfluenzae-3*.

9. A process according to claim 1 wherein the virus is a strain of Simian virus 5.

10. A process according to claim 1 wherein the virus is a strain of the respiratory syncytial virus.

11. A process according to claim 1 wherein the pH of the physiological saline solution is 7.4.

12. A process according to claim 1 wherein the virus is a strain of rubella virus.

13. A process according to claim 12 wherein the strain is rubella virus HPV-77.

References Cited

Herbert, Phytopathology, vol. 53, p. 362, 1963.

RICHARD L. HUFF, Primary Examiner